United States Patent
Sivaramalingam et al.

(10) Patent No.: US 11,575,958 B2
(45) Date of Patent: Feb. 7, 2023

(54) PROGRESSIVE INCREASE IN MULTIMEDIA STREAMING QUALITY

(71) Applicant: International Business Machines Corporation, Armonk, NY (US)

(72) Inventors: Balamurugaramanathan Sivaramalingam, Paramakudi (IN); Sathya Santhar, Ramapuram (IN); Samuel Mathew Jawaharlal, Chennai (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 19 days.

(21) Appl. No.: 16/118,537

(22) Filed: Aug. 31, 2018

(65) Prior Publication Data

US 2020/0077132 A1    Mar. 5, 2020

(51) Int. Cl.
*H04N 21/426* (2011.01)
*H04N 21/44* (2011.01)
*H04N 21/462* (2011.01)

(52) U.S. Cl.
CPC . *H04N 21/42607* (2013.01); *H04N 21/44004* (2013.01); *H04N 21/4621* (2013.01)

(58) Field of Classification Search
CPC ....... H04N 21/42607; H04N 21/44004; H04N 21/4621
See application file for complete search history.

(56) References Cited

U.S. PATENT DOCUMENTS

| | | | |
|---|---|---|---|
| 6,766,407 B1 | 7/2004 | Lisitsa | |
| 7,558,869 B2 | 7/2009 | Leon | |
| 10,003,797 B2 * | 6/2018 | Henry | H04N 21/6379 |
| 2006/0023748 A1 * | 2/2006 | Chandhok | H04N 21/234327 370/469 |
| 2008/0133766 A1 | 6/2008 | Luo | |
| 2009/0019178 A1 | 1/2009 | Melnyk | |
| 2012/0005368 A1 * | 1/2012 | Knittle | H04N 21/23805 709/235 |
| 2012/0281115 A1 * | 11/2012 | Kouncar | H04N 9/8042 348/231.99 |
| 2014/0052846 A1 | 2/2014 | Scherkus | |
| 2014/0204100 A1 | 7/2014 | Holland | |
| 2016/0080237 A1 | 3/2016 | Halepovic | |

(Continued)

*Primary Examiner* — Nnenna N Ekpo
(74) *Attorney, Agent, or Firm* — Aaron N. Pontikos (57) ABSTRACT

A computer-implemented includes streaming a first segment of multimedia data to a buffer on a first computing device at a first bitrate, wherein the first segment includes a first set of video frames encoded at a first resolution. The computer-implemented method further includes streaming a second segment of the multimedia data to the buffer on the first computing device at a second bitrate, wherein the second segment includes a second set of video frames encoded at a second resolution. The computer-implemented method further includes determining that a first predetermined threshold is reached. The computer-implemented method further includes streaming, in response to determining that the first predetermined threshold is reached, a third segment of multimedia data to the buffer on the first computing device, wherein the third segment includes a first set of pixels that are logically related to the second set of video frames of the second segment.

8 Claims, 3 Drawing Sheets

(56) References Cited

U.S. PATENT DOCUMENTS

2016/0182906 A1     6/2016  Panchagnula
2018/0041788 A1*    2/2018  Wang ................. H04N 21/2343
2020/0128293 A1*    4/2020  Mittal ............ H04N 21/234327

* cited by examiner

PROGRESSIVE INCREASE IN MULTIMEDIA STREAMING QUALITY

BACKGROUND

The present invention relates generally to the field of streaming, and more particularly to multimedia streaming quality.

Streaming (i.e., media streaming, multimedia streaming, or data streaming) is the constant delivery of data (i.e., text, audio, images, animations, video, or any combination thereof) from a provider to a client end-user. Generally, streaming describes the act of playing media on one device when the media is actually stored on another device. More particularly, media streaming is video, or audio content sent in compressed form over the Internet and played immediately, rather than being downloaded or saved to the hard drive of the client end-user. Accordingly, media streaming is an alternative to file downloading, in which the client-end user is required to download the entire file before viewing or listening to the file.

The quality (i.e., resolution) of video streaming is dependent, at least in part, on a video's bitrate (i.e., bit rate) and a network's bandwidth (i.e., network bandwidth, data bandwidth, or digital bandwidth). The amount of data required to encode a single second of video for a given resolution is referred to as a video's bitrate (measured in bytes per second). Resolution is the number of pixels spread across a display screen and is usually written as the number of pixels in the horizontal axis by the number of pixels in the vertical axis (e.g., 1280×720). Accordingly, as the resolution of a video increases, so too does the amount of data required to encode the video at a given resolution.

Bandwidth is the maximum rate of data transfer across a given path. Bandwidth or "throughput" of a media stream is measured by its bitrate, which is the amount of data (in bytes) that can be transferred per unit time (typically per second) across a network connection. Generally, there are two types of bitrates: (i) constant bitrate (CBR) and (ii) variable bitrate (VBR). Constant bitrate is the constant rate at which output data is consumed per unit of time. Constant bitrate is ideal for streaming a static image which requires a single and constant bitrate. Variable bitrate allocates data based on the complexity of the multimedia data. Variable bitrate is more commonly used for video streaming and is ideal for streaming video having a multitude of video segments with differing complexions.

SUMMARY

According to one embodiment of the present invention, a computer-implemented method for increasing a resolution of multimedia data streamed to a buffer of a computing device is disclosed. The computer-implemented method includes receiving a request to stream, by a first computing device, a multimedia file stored on a second computing device. The computer-implemented method further includes streaming a first segment of multimedia data to a buffer on the first computing device at a first bitrate, wherein the first segment of multimedia data includes a first set of video frames encoded at a first resolution. The computer-implemented method further includes streaming a second segment of the multimedia data to the buffer on the first computing device at a second bitrate, wherein the second segment of multimedia includes a second set of video frames encoded at a second resolution. The computer-implemented method further includes determining that a first predetermined threshold is reached. The computer-implemented method further includes streaming, in response to determining that the first predetermined threshold is reached, a third segment of multimedia data to the buffer on the first computing device, wherein the third segment of multimedia data includes a first set of pixels that are logically related to the second set of video frames included in the second segment of multimedia data.

According to another embodiment of the present invention, a computer program product for increasing a resolution of multimedia data streamed to a buffer of a computing device is disclosed. The computer program product includes one or more computer readable storage media and program instructions stored on the one or more computer readable storage media. The program instructions include instructions to receive a request to stream, by a first computing device, a multimedia file stored on a second computing device. The computer program product further includes instructions to stream a first segment of multimedia data to a buffer on the first computing device at a first bitrate, wherein the first segment of multimedia data includes a first set of video frames encoded at a first resolution. The computer program product further includes instructions to stream a second segment of the multimedia data to the buffer on the first computing device at a second bitrate, wherein the second segment of multimedia includes a second set of video frames encoded at a second resolution. The computer program product further includes instructions to determine that a first predetermined threshold is reached. The computer program product further includes instructions to stream, in response to determining that the first predetermined threshold is reached, a third segment of multimedia data to the buffer on the first computing device, wherein the third segment of multimedia data includes a first set of pixels that are logically related to the second set of video frames included in the second segment of multimedia data.

According to another embodiment of the present invention, a computer system for increasing a resolution of multimedia data streamed to a buffer of a computing device is disclosed. The computer system includes one or more computer processors, one or more computer readable storage media, and computer program instructions. The computer program instructions further include instructions stored on the one or more computer readable storage media for execution by the one or more computer processors. The computer program instructions further include instructions to receive a request to stream, by a first computing device, a multimedia file stored on a second computing device. The computer program product further includes instructions to stream a first segment of multimedia data to a buffer on the first computing device at a first bitrate, wherein the first segment of multimedia data includes a first set of video frames encoded at a first resolution. The computer program product further includes instructions to stream a second segment of the multimedia data to the buffer on the first computing device at a second bitrate, wherein the second segment of multimedia includes a second set of video frames encoded at a second resolution. The computer program product further includes instructions to determine that a first predetermined threshold is reached. The computer program product further includes instructions to stream, in response to determining that the first predetermined threshold is reached, a third segment of multimedia data to the buffer on the first computing device, wherein the third segment of multimedia data includes a first set of pixels that are logically related to the second set of video frames included in the second segment of multimedia data.

DETAILED DESCRIPTION

Streaming refers to the continuous delivery of multimedia data from one source, such as a host network service, to an end-user client device. Multimedia data to be streamed can be stored in a cloud computing environment, on a personal computer, media server, or network attached storage device ("NAS") and accessed via a web-based or client-based application. When accessed, multimedia data is transmitted by a server application and received and displayed in real-time via a client application, such as a media player. A media player can be an integral part of a web browser, a plug-in, a separate program, or a dedicated device.

Embodiments of the present invention recognize that improvements in streaming multimedia, and more particularly, improvements in bandwidth consumption while streaming multimedia are needed. For example, current streaming technologies, such as adaptive bitrate streaming, adjust the quality of the media stream based on a user's bandwidth. With adaptive bitrate streaming, multimedia data (video or audio) is encoded at multiple bitrates, wherein each of the different bitrate streams are segmented into smaller, multi-second segments (typically between 2 and 10 seconds in length). Depending on the available bandwidth, the bitrate for the next segment of the video stream to be streamed can be adjusted to include the appropriate bitrate based on the available bandwidth.

Embodiments of the present invention recognize several deficiencies with current streaming technologies. For example, embodiments of the present invention recognize that current streaming technologies, such as adaptive bitrate streaming, only adjust the bitrate for video segments that have yet to be streamed to the client-device. This is disadvantageous if the amount of available bandwidth or network speed increases while a user is watching a video segment encoded in a lower bitrate. In this scenario, even if the amount of available bandwidth or network speed increases, a user must continue to watch those video segments already streamed to the client device at a lower bitrate. Thus, current streaming technologies lack an ability to upgrade or increase the resolution and bitrate of video segments for those video segments that have been streamed and stored in a data buffer of a client device.

Embodiments of the present invention recognize that current streaming technologies consume unnecessary or excessive amounts of bandwidth while a user navigates a media player timeline user interface (e.g., re-playing video segments already streamed to a client device, skipping or fast forwarding past video segments already streamed to a client device, and exiting an online streaming application prior to viewing video segments already streamed to a client device). For example, a video segment is streamed to a client device at a first bitrate (e.g., 2 Mbps) and at a first resolution (e.g., 800×600) based on an amount of available bandwidth. If a user desires to re-watch the same video segment at a higher bitrate (e.g., 5 Mbps) and at a higher resolution (e.g., 1280×1024), and the amount of available bandwidth at the time the user re-watches the video segment is greater than when the video segment was initially streamed, current streaming technologies will re-deliver the same video segment at a higher bitrate and a higher resolution (e.g., 1280×1024). This results in an unnecessary or excessive use of bandwidth since the same video segment is streamed twice at two different bitrates (e.g., for a total of 7 Mbps).

Furthermore, embodiments of the present invention recognize that the actions of a user when viewing a video are unpredictable. In other words, a user can choose to stop viewing a video or skip to a future scene without notice. Whereas current streaming technologies stream data in segments of fixed size and of a fixed bitrate, if a user skips or fast forwards past video segments already streamed, a waste in available network resources (due to unnecessary bandwidth consumption) occurs for those segments of the video that the user does not view. This becomes especially disadvantageous if those video segments that the user does not view were streamed at a higher bitrate.

Embodiments of the present invention provide one or more of: features, characteristics, operations, and/or advantages to the above-mentioned deficiencies in the field of multimedia streaming and generally encompass: (i) an improvement to at least the field of multimedia streaming and (ii) a technical solution to one or more of the challenges in the field of multimedia streaming. Such challenges in the field of multimedia streaming include, but are not limited to, one or more of: (i) limitations in streaming multimedia data based on an amount of available bandwidth of a client device for streaming multimedia data, (ii) limitations in streaming multimedia data based on a client device's network speed, (iii) limitations in adjusting or modifying the quality of video segments already transmitted to a client device, (iv) limitations in increasing the quality of video segments already transmitted to a client device in response to an increase in available bandwidth and/or network speed, (v) limitations in reducing and/or eliminating unnecessary bandwidth consumption due to streaming video segments (of which a user skips, fast forwards past, or otherwise does not view) at high bitrates, and (vi) limitations in the transmission of multiple video segments of varying bitrates due to replaying a video segment after network bandwidth increases (e.g., a video segment is initially watched at a first, lower bitrate and if network bandwidth increases and a user chooses to re-watch the video segment, the video segment is retransmitted at a second, higher bitrate). Certain embodiments of the present invention both recognize and address other challenges that are not specifically addressed herein but are readily understood to be encompassed by the technical solutions described herein.

Embodiments of the present invention provide one or more of features, characteristics, operations, advantages, and/or improvements to the aforementioned challenges in the field of streaming multimedia data by providing: (i) an ability to adjust or increase the video quality (i.e., resolution) of data already streamed and stored by a buffer of a client device, (ii) an ability to transmit additional pixels to increase the resolution of multimedia data already streamed to a client device if an increase in available bandwidth and/or network speed occurs, (iii) a reduction in unnecessary bandwidth consumption for those portions of a video that are streamed at a higher bitrate, but not viewed, and (iv) a reduction in bandwidth consumption due to streaming multiple video segments of varying bitrates due to replaying a video segment after an increase in network bandwidth occurs. Thus, a reduction in unnecessary or wasted bandwidth consumption ultimately results in an increase in the amount of available bandwidth for streaming multimedia data, as well as an increase in the amount of computing resources available.

Embodiments of the present invention provide one or more improvements to the aforementioned limitations to the field of multimedia streaming by initially streaming a first video segment at a higher bitrate and at least a second video segment at a lower bitrate. As the video progresses and nears those frames corresponding to the second video segment, if available bandwidth of a client network permits (i.e., sufficient bandwidth is available), embodiments of the present invention transmit additional pixels (thereby increasing the video resolution) for those frames included in the second video segment which have already been streamed and stored in a media player buffer.

Embodiments of the present invention provide one or more improvements to the aforementioned limitations in the field of multimedia streaming by transmitting video segments at a lower bitrate (lower quality) than the optimal bitrate for a given amount of available bandwidth. For example, if a client's network speed is 10 Mbps and the optimal bitrate for 1024×768 video quality is 5 Mbps, embodiments of the present invention will stream a video segment in which the data is streamed at a 640×480 video quality (or a bitrate of approximately 2 Mbps). As the video progresses and nears those frames corresponding to a video segment of lower quality (e.g., 640×480) stored in the video buffer, embodiments of the present invention transmit additional pixels to increase the quality of the video segment. For example, an additional 384×288 pixels are transmitted to increase the resolution of the video segment from 640×480 to 1024×768.

It should be appreciated that by streaming video segments at a lower than optimal bitrate and transmitting additional pixels prior to watching the video segment, a video is still able to be viewed at the highest quality permitted by a user's available network bandwidth. Furthermore, if a user chooses to skip, fast forward, or otherwise not view portions of a video, embodiments of the present invention ultimately reduce and/or eliminate unnecessary bandwidth consumption since video segments are initially transmitted at a lower bitrate.

Figure 1:
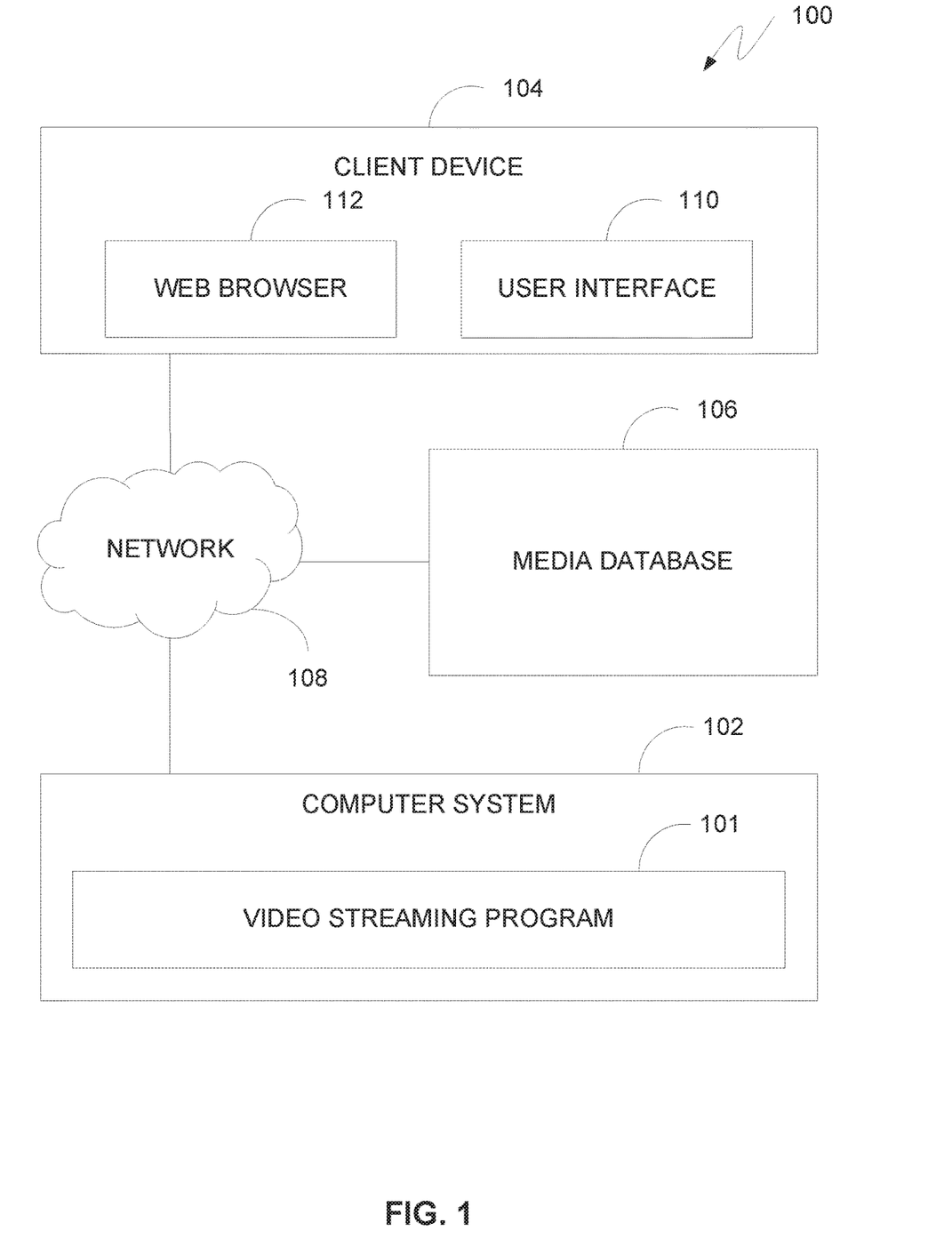
FIG. 1 is a functional block diagram of a network computing environment, generally designated 100, suitable for operation of a video streaming program 101 in accordance with at least one embodiment of the invention.

Referring now to various embodiments of the invention in more detail, FIG. 1 is a functional block diagram of a network computing environment, generally designated 100, suitable for operation of a video streaming program 101 in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes computer system 102, client device 104, and media database 106 interconnected over network 108. In embodiments of the invention, network 108 can be a telecommunications network, a local area network (LAN), a wide area network (WAN), such as the Internet, or a combination of the three, and can include wired, wireless, or fiber optic connections. Network 108 may include one or more wired and/or wireless networks that are capable of receiving and transmitting data, voice, and/or video signals, including multimedia signals that include voice, data, and video formation. In general, network 108 may be any combination of connections and protocols that will support communications between computer system 102, client device 104, media database 106, and other computing devices (not shown) within network computing environment 100.

In some embodiments, network 108 is any combination of connections and protocols that will support streaming video and audio, such as the real-time transfer protocol (RTP), real-time streaming protocol (RTSP), real-time transport control protocol (RTCP), and hypertext transfer protocol (HTTP) (for media to be streamed that is stored on a web server). In some embodiments, network 108 is any combination of connections and protocols that will support broadcast or "live" streaming between computer system 102 and a plurality of client devices, such as client device 104. In some embodiments, network 108 is any combination of connections and protocols that will support unicast streaming between computer system 102 and a plurality of client devices, such as client device 104. In some embodiments, network 108 is any combination of connections and protocols that will support multicast streaming between computer system 102 and a plurality of client devices, such as client device 104. For example, network 108 exists within an internet protocol (IP) network that supports user datagram protocol (UDP). In an embodiment, internet group management protocol (IGMP) is added on top of UDP to further support receiving multicast messages by a client device, such as client device 104. In an embodiment, a reliable multicast protocol is added on top of UDP. The addition of a reliable multicast protocol on top of UDP provides loss detection and retransmission of lost datagrams. For example, pragmatic general multicast (PGM) or scalable reliable multicast (SRM) is added on top of UDP.

In various embodiments of the invention, computer system 102 is a computing device that can be a standalone device, a management server, a web server, a media server, a mobile computing device, or any other programmable electronic device or computing system capable of receiving, sending, and processing data. In other embodiments, computer system 102 represents a server computing system utilizing multiple computers as a server system, such as in a cloud computing environment. In an embodiment, computer system 102 represents a computing system utilizing clustered computers and components (e.g. database server computers, application server computers, web servers, and media servers) that act as a single pool of seamless resources when accessed within network computing environment 100. In general, computer system 102 represents any programmable electronic device or combination of programmable electronic devices capable of executing machine readable program instructions and communicating with client device 104 and media database 106 within network computing environment 100 via a network, such as network 108.

Computer system 102 includes video streaming program 101. Although video streaming program 101 is depicted in FIG. 1 as being integrated with computer system 102, in alternative embodiments, video streaming program 101 is remotely located from computer system 102. For example, video streaming program 101 can be integrated with client device 104. Computer system 102 may include internal and external hardware components, as depicted and described in further detail with respect to FIG. 3.

In various embodiments of the present invention, client device 104 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, client device 104 represents any programmable electronic devices or combination of programmable electronic devices capable of executing machine readable program instructions and communicating with computer system 102, media database 106, and other computing devices (not shown) within network computing environment 100 via a network, such as network 108.

Client device 104 includes user interface 110. User interface 110 provides an interface between client device 104, computer system 102, and media database 106. In some embodiments, user interface 110 can be a graphical user interface (GUI) or a web user interface (WUI) and can display text, documents, web browser windows, user options, application interfaces, and instructions for operation, and includes the information (such as graphic, text, and sound) that a program presents to a user and the control sequences the user employs to control the program. In some embodiments, client device 104 accesses media streamed from computer system 102 via a client-based application that runs on client device 104. For example, client device 104 includes mobile application software that provides an interface between client device 104 and computer system 102.

In some embodiments, client device 104 accesses media streamed from computer system 102 via web-based application that runs on web browser 112. Web browser 112 is a software application for retrieving, presenting, and traversing web resources on the World Wide Web ("WWW"). A web resource is anything that can be obtained from the WWW, such as webpages, e-mail, information from databases, and web services. In some embodiments, web browser also stores HTTP cookies (i.e., web cookies, browser cookies, or cookie) in media database 106. Cookies are small pieces of data sent from a webpage used to record a user's browsing activity (e.g., which buttons or links were clicked, which webpages a user previously visited, and which portions of a video or audio accessed by a link on a webpage a user watched or listened to).

Media database 106 is a data repository that can store, gather, and/or analyze information. In some embodiments, media database 106 is located externally to computer system 102 and client device 104 and accessed through a communication network, such as network 108. In some embodiments, media database 106 is stored on computer system 102. In some embodiments, media database 106 resides on another computing device (not shown), provided that media database 106 is accessible by computer system 102 and client device 104. In embodiments of the invention, video streaming program 101 stores and accesses various information to/from media database 106, including, but not limited to media streamed via client device 104, video segments encoded in various bitrates, as well historical network speed and bandwidth patterns. In some embodiments, media database 106 stores historical information including the average amount of available bandwidth corresponding to the day of the week and time. In some embodiments, media database 106 stores a history log by user of data usage corresponding to the device, day of the week, and time. For example, video streaming program 101 accesses media database 106 information to determine more users stream data between 5:00-8:00 pm on weekdays and 7:00-9:00 pm on weekends. In some embodiments, information stored in media database 106 is used to determine bandwidth consumption trends, as well as future bandwidth consumption information.

Figure 2:
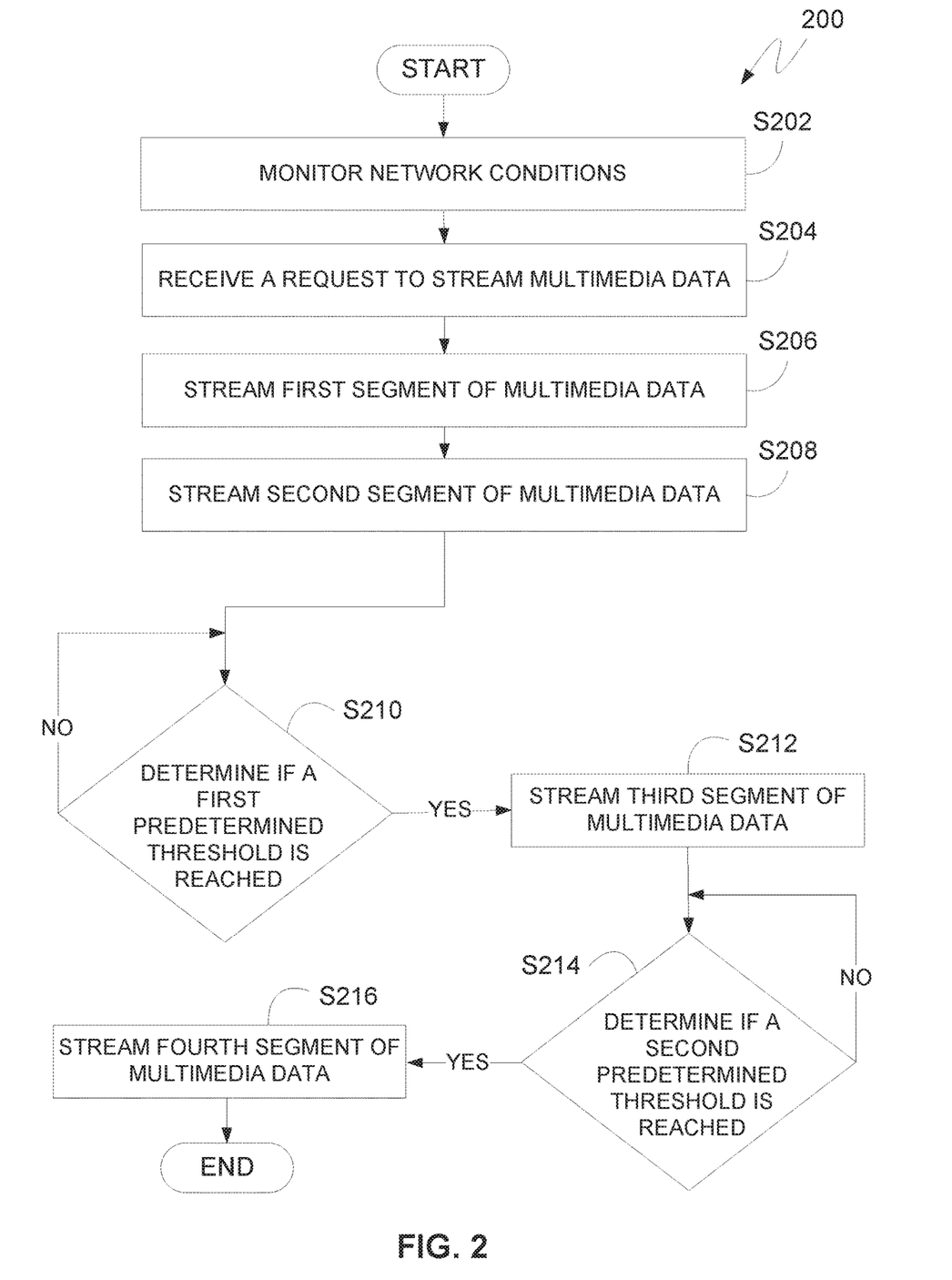
FIG. 2 is a flow chart diagram depicting operational steps for a video streaming program 101 in accordance with at least one embedment of the invention.

FIG. 2 is a flow chart diagram depicting operational steps for video streaming program 101 in accordance with at least one embodiment of the invention. It should be appreciated that embodiments of the present invention provide at least for reducing the amount of bandwidth wasted while streaming multimedia data from computer system 102 to client device 104. In embodiments of the invention, video streaming program 101 operates to decrease bandwidth wastage by streaming a portion of a video segment encoded at a bitrate that is below the optimal bitrate for a network, and in response to determining that a predetermined threshold is reached, modifying, increasing, or otherwise upgrading the video segment to a higher resolution (higher video quality) by transmitting additional pixels after the video segment has been transmitted to an end user, such as client device 104.

FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. It should be appreciated that the process depicted in FIG. 2 illustrates one possible iteration of video streaming program 101, which repeats for each selected multimedia streamed or each selected encoded segment.

At step S202, video streaming program 101 monitors network conditions. In embodiments of the invention, video streaming program 101 monitors bandwidth and network usage data associated with a router in a network, such as network 108. For example, bandwidth and network usage data associated with a router is communicated to video streaming program via a network protocol (e.g., Simple Network Management Protocol (SNMP) and Netflow Protocol). In embodiments of the invention, video streaming program 101 monitors network conditions to determine an amount of available bandwidth. In embodiments of the invention, video streaming program 101 monitors network conditions to determine an amount of available bandwidth at a future point in time. In some embodiments, monitoring network conditions includes determining an amount of available bandwidth on a network, such as network 108. In some embodiments, monitoring network conditions includes determining the network's speed. In some embodiments, monitoring network conditions includes determining the current number of devices connected to the network. In some embodiments, monitoring includes identifying network congestion (i.e., network traffic).

At step S204, video streaming program 101 receives a request to stream multimedia data from computer system 102 to client device 104 via network 108. In some embodiments, video streaming program 101 obtains one or more user viewing preferences with respect to the multimedia data. In these embodiments, video streaming program 101 obtains user preferences in order to determine which portions of a video to stream. In some embodiments, user preferences are preset. In other words, the preferences are preselected by a user prior to receiving a request to stream the multimedia data.

In some embodiments, video streaming program 101 obtains user viewing preferences after a user selects multimedia data to be streamed. In some embodiments, video streaming program 101 prompts a user to enter or select their preferences via user interface 110. In some embodiments, video streaming program 101 displays a pop-up window via user interface 110. In an embodiment, a pop-up window is presented to a user when a video is selected to be streamed. In some embodiments, video streaming program 101 displays a menu selection for the user via user interface 110. In any of these embodiments, video streaming program 101 displays one or more options for the user to select, which include, but are not limited to: (i) an option to stream the entire multimedia content, (ii) an option to stream a particular portion of the multimedia content, (iii) an option to stream the entire multimedia content immediately and watch the multimedia content at a later time (e.g., due to limited time high speed network access), (iv) an option to stream multimedia content at a higher bitrate (i.e., higher video quality), and (v) an option to stream multimedia content at a lower bitrate (i.e., a lower video quality).

At step S206, video streaming program 101 streams a first segment of multimedia data at a first bitrate. In embodiments of the invention, streaming a first segment includes loading the data contents of the first segment onto a data buffer on client device 104. In some embodiments, video streaming program 101 streams segments of multimedia data to web browser 112 of client device 104 via a web-based application. In some embodiments, video streaming program 101 streams segment of multimedia data to user interface of client device via a client-based application.

In embodiments of the invention, the first segment is dependent upon the portion of a video in which a user initially requests to stream. For example, if a user requests to stream a video from the beginning, then the first segment will correspond to a portion of the video beginning with the first video frame. In another example, if a user requests to begin streaming a video five minutes into the video, then the first segment will correspond to the portion of the video beginning with the fifth minute of the video.

In embodiments of the invention, a segment includes a predetermined number of seconds of video. Each segment further includes a set of video frames that constitute the video. In embodiments of the invention, a set of video frames included in a segment are encoded at a predetermined resolution. For example, one second of video typically includes 24 frames. Accordingly, if the first segment is ten seconds in length, then the first segment will include a set of 240 video frames.

In embodiments of the invention, video streaming program 101 encodes a set of video frames included in the first segment at a first resolution. In some embodiments, the first resolution is based on determining an optimized bitrate for a network of an end-user device, such as client device 104. In other words, the first resolution is based on a networks current conditions and available resources (e.g., network speed and available bandwidth). For example, an amount of available bandwidth over network 108 is 10 Mbps and the optimal bitrate for streaming video at a resolution of 1280× 1024 is 5 Mbps. Since the amount of available bandwidth exceeds the optimal bitrate for streaming video at a resolution of 1280×1024 video streaming program encodes the set of frames included in the first segment at a resolution of 1280×1024. In some embodiments, video streaming program 101 encodes a set of video frames included in the first segment irrespective of a networks current conditions and available resources. For example, a set of video frames included in the first segment are encoded at a highest available resolution for a given video.

At step S208, video streaming program 101 streams a second segment of multimedia data at a second bitrate. In embodiments of the invention, the second segment is sequentially related to the set of video frames included in the first segment. For example, if the first segment includes a set of video frames corresponding to the first ten seconds (time 0 to time 10 seconds) of a video, video streaming program 101 streams a second segment of multimedia data that includes a set of video frames corresponding to the next ten seconds (time 10 seconds to time 20 seconds) of the video.

In embodiments of the invention, the second segment includes a predetermined number of seconds of video encoded at a predetermined resolution. The second segment further includes a set of video frames that constitute the video. For example, one second of video typically includes 24 frames. Accordingly, if the second segment is 20 seconds in length, then the second segment will include a set of 480 video frames. In some embodiments, the number of video frames included in the second segment should not exceed a predetermined threshold. This is to ensure that in the event that a user decides to stop watching, fast forward, or otherwise skip a portion of a video corresponding to the video frames included in the second segment, bandwidth wastage is minimized or otherwise eliminated.

In some embodiments, a predetermined number of video frames included in the second segment is established by a user of client device 104 prior to streaming the video. For example, if a user will be connected to a network, such as network 108, for a short period of time, video streaming program increases the number of video frames included in the second segment. In some embodiments, a predetermined number of video frames included in the second segment is automatically established by video streaming program 101. In these embodiments, the predetermined number of video frames is based, at least in part, on an amount of: (i) current or "real-time" available bandwidth and (ii) predicted future available bandwidth. This is to ensure that video frames are streamed and loaded to the buffer in such a manner that video stoppage does not occur.

In embodiments of the invention, video streaming program 101 encodes a set of video frames included in the second segment at a second, predetermined resolution. In some embodiments, the set of video frames included in the second segment are encoded at a lower resolution (i.e., lower video quality) than the first encoded segment. For example, if the set of video frames included in the first segment are streamed at a higher resolution of 1280×1024 at a bitrate of 2.5 Mbps, the second set of video frames included in the second segment are streamed at a lower resolution of 640×480 at a bitrate of 0.6 Mbps.

In some embodiments, the set of video frames included in the second segment of multimedia data are encoded irrespective of the optimized bitrate for a network of an end user device, such as client device 104. In other words, the set of video frames included in the second segment are encoded at a second, lower resolution regardless of a networks current conditions and available resources (e.g., network speed and available bandwidth). For example, an amount of available bandwidth over network 108 is 10 Mbps and the optimal bitrate for streaming video at a resolution of 1280×1024 is 5 Mbps. Although there is ample available bandwidth to stream video at a resolution of 1280×1024, video streaming program 101 encodes and streams a set of video segments included in the second segment at a resolution of 640×480.

In some embodiments, video streaming program 101 encodes a set of video frames included in the second segment based, at least in part, on current or "real-time" available network resources. In these embodiments, video streaming program 101 encodes a set of video frames included in the second segment based on determining an optimal bitrate. This is to ensure that: (i) video frames are delivered to a user of client device 104 without stoppage or buffering of the video, and (ii) video frames are delivered to a user of client device 104 in the viewer expected quality. In some embodiments, encoding the video frames included in the second segment is further based, at least in part, on predicted future available network resources. In these embodiments, video streaming program 101 takes into account a predicted amount of future available bandwidth to ensure that ample bandwidth is available to stream a set of additional pixels to upgrade the resolution of the set of video frames included in the second segment after the set of video frames included in the second segment have been streamed and stored in a media player buffer of an end-user device, such as client device 104.

In some embodiments, if an amount of available bandwidth is above a predetermined threshold, video streaming program 101 streams a second encoded segment at a higher resolution. In some embodiments, if an amount of available bandwidth is below a predetermined threshold, video streaming program 101 streams a second encoded segment at a lower resolution. In any of these embodiments, video streaming program 101 streams the set of video frames included in the second segment at a lower resolution than the set of video frames included in the first segment.

At decision step S210, video streaming program 101 determines if a first predetermined threshold is reached. In embodiments of the invention, video streaming program 101 determines if the first predetermined threshold is reached based on monitoring the progression of the video displayed or otherwise viewed on client device 104. In some embodiments, the first predetermined threshold is reached based on playing or otherwise viewing a particular portion of the video.

In some embodiments, video streaming program 101 determines if the first predetermined threshold is reached based on monitoring the set of video frames displayed or otherwise viewed via client device 104 for a predetermined frame. For example, the first segment includes a set of 250 video frames that constitute the first 10 seconds of a video. In this example, the first predetermined threshold is set at 100 frames. Accordingly, video streaming program 101 determines that the first predetermined threshold is reached if the $100^{th}$ frame is played or otherwise displayed via client device 104.

In some embodiments, video streaming program 101 determines if the first predetermined threshold is reached based on monitoring the first segment for a predetermined timeframe. For example, the first segment includes a set of 250 video frames that constitute the first 10 seconds of a video. In this example, the first predetermined threshold is set at 4 seconds.

Accordingly, video streaming program 101 determines that the first predetermined threshold is reached if the $4^{th}$ second of the video corresponding to the first segment is played or otherwise displayed via client device 104.

If video streaming program 101 determines that the first predetermined threshold is reached, video streaming program 101 proceeds to step S212 (decision step "YES" branch). If video streaming program 101 determines that the first predetermined threshold is not reached, video streaming program 101 returns to decision step S210 (decision step "NO" branch).

At step S212, in response to determining that the first predetermined threshold is reached, video streaming program 101 streams a third segment of multimedia data. In embodiments of the invention, the third segment includes a set of pixels that are logically related to the set of video frames included in the second segment. For example, if the second segment includes a set of 240 video frames corresponding to time 10 seconds to time 20 seconds, video streaming program 101 streams a third segment, of which the third segment includes a set of additional pixels that are logically related to each video frame in the set of 240 video frames corresponding to time 10 seconds to time 20 seconds of the video.

In some embodiments, video streaming program 101 streams the set of pixels included in the third segment to partially upgrade the resolution (i.e., video quality) of the set of video frames included in the second segment previously streamed and stored in a media player buffer of an end-user device, such as client device 104. For example, video streaming program 101 streams a first segment (including a set of 240 video frames) encoded at a first, higher resolution (e.g., 1024×768) for the first ten seconds (time 0 to time 10 seconds) of a video and a second segment (including a set of 240 video frames) encoded at a second, lower resolution (e.g., 640×480) for the next 10 seconds (time 10 seconds to time 20 seconds) of the video. In this example, a first predetermined threshold is set at video frame 100 of the first segment. Thus, upon a determination that the $100^{th}$ video frame of the first segment has been displayed or otherwise viewed via client device 104, video streaming program 101 streams a third segment including a set of pixels (e.g., 160×120 pixel/frame) that are logically related to each video frame in the set of 240 video frames included in the second segment. Accordingly, the set of pixels included in the third segment increase the resolution of the set of video frames included in the second segment from a lower resolution of 640×480 to a higher resolution of 800×600.

In some embodiments, a number of pixels in the set of pixels included in the third segment is determined irrespective of the optimized bitrate for a network of an end-user device, such as client device 104. In other words, the number of additional pixels in the set of pixels included in the third segment is determined regardless of a networks current conditions and available resources (e.g., network speed and available bandwidth).

In some embodiments, a number of pixels in the set of pixels included in the third segment is determined based on available network resources. In some embodiments, a number of pixels in the set of pixels included in the third segment is determined based on an optimal bitrate. Here, an optimal bitrate is determined to ensure that all video frames are displayed to a user of client device 104 in at a highest possible resolution. In some embodiments, if an amount of available bandwidth is above a predetermined threshold, video streaming program 101 increases the number of pixels in the set of pixels. For example, if the amount of available bandwidth is above the predetermined threshold, video streaming program 101 increases the number of pixels included in the set of pixels from 200 pixels to 300 pixels per frame. In some embodiments, if an amount of available bandwidth is below a predetermined threshold, video streaming program 101 decreases the number of pixels in the set of pixels. For example, if the amount of available bandwidth is below the predetermined threshold, video streaming program 101 decreases the number of pixels included in the set of pixels from 200 pixels to 150 pixels per frame.

In some embodiments, if an amount of available bandwidth is above a predetermined threshold, video streaming program 101 increases the number of pixels in the set of pixels such that the set of video frames included in the third segment are displayed to a user of client device 104 in a highest possible resolution (e.g., the highest possible resolution is based on the resolution of a display screen of a device). Accordingly, the set of pixels included in the third segment increase the resolution of the set of video frames included in the second segment from a lower resolution to the highest possible resolution (e.g., 1600×1200). In these embodiments, video streaming program 101 increases the number of pixels in the set of pixels such that the set of video frames included in the third segment either match or exceed the user quality preference. In these embodiments, a fourth segment of multimedia data is not required to upgrade the third segment.

At decision step S214, video streaming program 101 determines if a second predetermined threshold is reached. In embodiments of the invention, video streaming program 101 determines if the second predetermined threshold is reached based on monitoring the progression of the video displayed or otherwise viewed on client device 104. In some embodiments, the second predetermined threshold is reached based on playing or otherwise viewing a particular portion of the video. In some embodiments, video streaming program 101 determines if the second predetermined threshold is reached based on monitoring the set of video frames displayed or otherwise viewed via client device 104 for a predetermined frame. For example, the first segment includes a set of 250 video frames that constitute the first 10 seconds of a video. In this example, the second predetermined threshold is set at 200 frames. Accordingly, video streaming program 101 determines that the second predetermined threshold is reached if the 200$^{th}$ frame is played or otherwise displayed via client device 104.

In some embodiments, video streaming program 101 determines if the second predetermined threshold is reached based on monitoring the first segment for a predetermined timeframe. For example, the first segment includes a set of 250 video frames that constitute the first 10 second of a video. In this example, the first predetermined threshold is set at 4 seconds and the second predetermined threshold is set at 8 seconds. Accordingly, video streaming program 101 determines that the second predetermined threshold is reached if the 8$^{th}$ second of the video corresponding to the first segment is played or otherwise displayed via client device 104.

If video streaming program 101 determines that the second predetermined threshold is reached, video streaming program 101 proceeds to step S216 (decision step "YES" branch). If video streaming program 101 determines that the second predetermined threshold is not reached, video streaming program 101 returns to decision step S214 (decision step "NO" branch).

At step S216, in response to determining that the second predetermined threshold is reached, video streaming program 101 streams a fourth segment of multimedia data. In embodiments of the invention, the fourth segment includes a set of pixels that are logically related to the set of video frames included in the second segment. For example, if the second segment includes a set of 240 video frames corresponding to time 10 seconds to time 20 seconds, video streaming program 101 streams a fourth segment, of which the fourth segment includes a set of additional pixels that are logically related to each video frame in the set of 240 video frames corresponding to time 10 seconds to time 20 seconds of the video.

In some embodiments, video streaming program 101 streams the set of pixels included in the fourth segment to increase or upgrade the resolution (i.e., video quality) of the set of video frames included in the second segment previously streamed and stored in a media player buffer of an end-user device, such as client device 104. In some embodiments, the set of pixels included in the fourth segment further increase the resolution of the set of video frames included in the second segment in addition to a prior transmission of the set of pixels included in the third segment.

For example, video streaming program 101 streams a first segment (including a set of 240 video frames) encoded at a first, higher resolution (e.g., 1024×768) for the first ten seconds (time 0 to time 10 seconds) of a video and a second segment (including a set of 240 video frames) encoded at a second, lower resolution (e.g., 640×480) for the next 10 seconds (time 10 seconds to time 20 seconds) of the video. Each of the set of video frames included in the first segment and second segment are stored in a media player buffer on client device 104. In this example, a first predetermined threshold is set at video frame 100 of the first segment and a second predetermined threshold is set at video frame 200 of the first segment. Thus, upon a determination that the 100$^{th}$ video frame of the first segment has been displayed or otherwise viewed via client device 104, video streaming program 101 streams a third segment including a set of pixels (e.g., 160×120 pixel/frame) that are logically related to each video frame in the set of 240 video frames included in the second segment. Accordingly, the set of pixels included in the third segment increase the resolution of the set of video frames included in the second segment from a lower resolution of 640×480 to a higher resolution of 800×600. Further, upon a determination that the 200$^{th}$ video frame of the first segment has been displayed or otherwise viewed via client device 104, video streaming program 101 streams a fourth segment including a set of pixels (e.g., 224×168 pixel/frame) that are logically related to each video frame in the set of 240 video frames included in the second segment. Accordingly, the set of pixels included in the fourth segment increase the resolution of the set of video frames included in the second segment from a lower resolution of 800×600 to a higher resolution of 1024×768.

In some embodiments, a number of pixels in the set of pixels included in the fourth segment is determined irrespective of the optimized bitrate for a network of an end-user device, such as client device 104. In other words, the number of additional pixels in the set of pixels included in the fourth segment is determined regardless of a networks current conditions and available resources (e.g., network speed and available bandwidth).

In some embodiments, a number of pixels in the set of pixels included in the fourth segment is determined based on available network resources. In some embodiments, a number of pixels in the set of pixels included in the fourth segment is determined based on an optimal bitrate. Here, an optimal bitrate is determined to ensure that all video frames are displayed to a user of client device 104 in at a highest possible resolution. In some embodiments, if an amount of available bandwidth is above a predetermined threshold, video streaming program 101 increases the number of pixels in the set of pixels such that the set of video frames included in the second segment are displayed to a user of client device 104 in a highest possible resolution (e.g., the highest possible resolution is based on the resolution of a display screen of a device).

In some embodiments, if an amount of available bandwidth is below a predetermined threshold, video streaming program 101 decreases the number of pixels in the set of pixels. For example, if the amount of available bandwidth is below the predetermined threshold, video streaming program 101 decreases the number of pixels included in the set of pixels from 200×150 to 150×100 pixels per frame. In some embodiments, if an amount of available bandwidth is below a predetermined threshold, video streaming program 101 does not increase the resolution of the set of video frames included in the second segment and stored in a media player buffer on client device 104. In other words, video streaming program 101 does not stream a set of addition pixels that are logically related to the set of video frames included in the second segment.

It should be appreciated that the process depicted in FIG. 2 illustrates one possible iteration of video streaming program 101, which repeats for future segments of video yet to be streamed. In other words, video streaming program 101 continues to stream additional sets of video frames at a resolution lower than the optimal bitrate and then upgrades the future sets of video frames based on determining when a predetermined threshold is reached.

Figure 3:
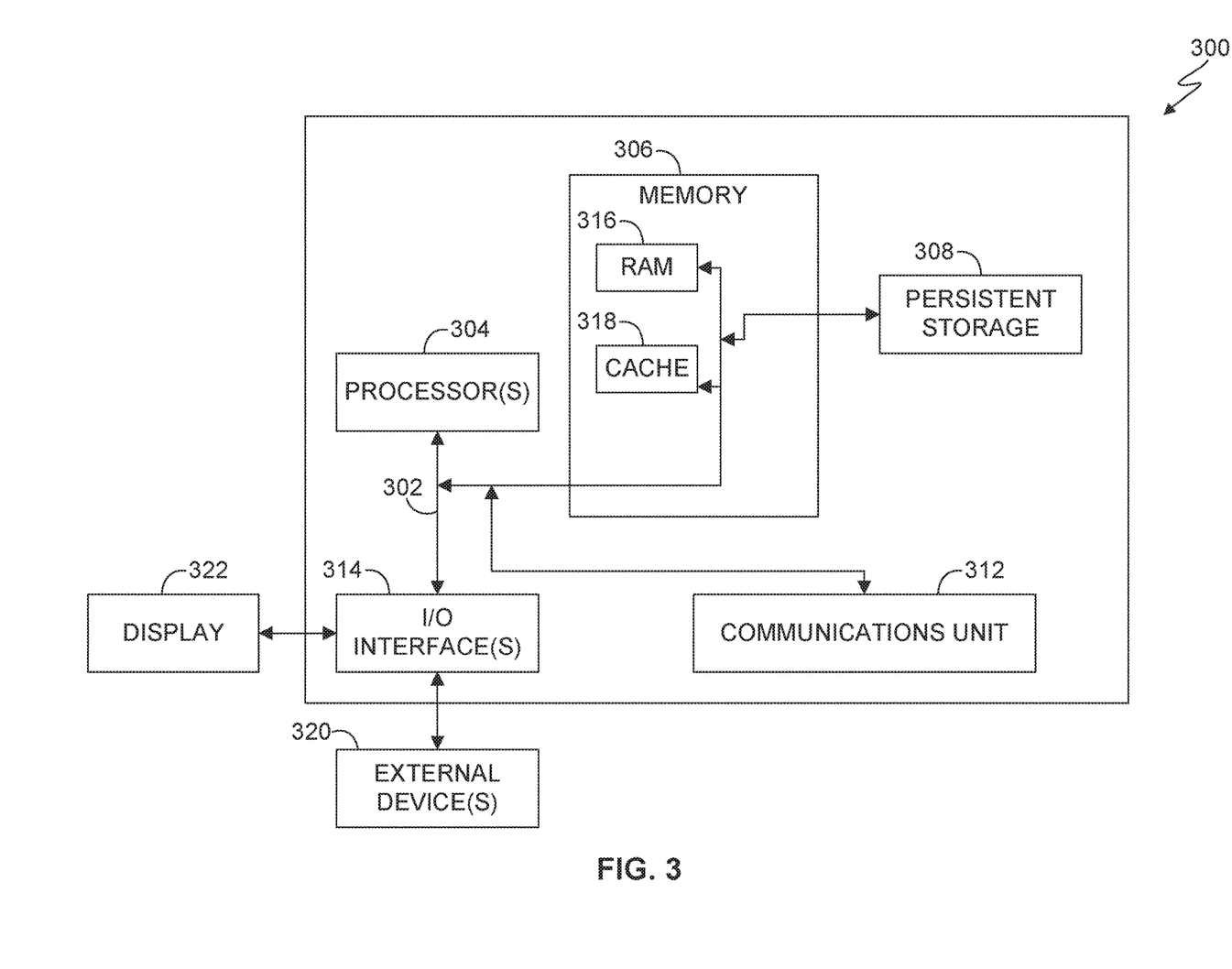
FIG. 3 is a block diagram depicting components of a computer, generally designated 300, suitable for executing a video streaming program 101 in accordance with at least one embodiment of the invention.

FIG. 3 is a block diagram depicting components of a computer 300 suitable for video streaming program 101, in accordance with at least one embodiment of the invention. FIG. 3 displays the computer 300, one or more processor(s) 304 (including one or more computer processors), a communications fabric 302, a memory 306 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with an architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random-access memory (RAM) 316 and a cache 318. In general, the memory 306 may comprise any suitable volatile or non-volatile one or more computer readable storage media.

Program instructions for video streaming program 101 may be stored in the persistent storage 308, or more generally, any computer readable storage media, for execution by one or more of the respective computer processors 304 via one or more memories of the memory 306. The persistent storage 308 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received, and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   streaming a first segment of a multimedia file to a buffer of a computing device at a first bitrate, wherein the first segment of the multimedia file includes a first set of video frames encoded at a first resolution;
   streaming, in response to determining that a predetermined frame number of a first portion of the first set of video frames previously streamed to the buffer of the computing device has been displayed on a display screen of the computing device, an additional set of pixels to be added to respective frames of a second portion of the first set of video frames previously streamed to the buffer of the computing device but yet to be displayed on the display screen of the computing device, wherein a predetermined number of pixels included in the additional set of pixels to be added to the respective frames of the second portion of the first set of video frames is increased responsive to an amount of available bandwidth being above a predetermined threshold and decreased responsive to the amount of available bandwidth being below the predetermined threshold; and
   adding the additional set of pixels to respective frames of the second portion of first set of video frames previously streamed to the buffer of the computing device to increase the resolution of the second portion of the first set of video frames prior to displaying the second portion of the first set of video frames on the display screen of the computing device.

2. The computer-implemented method of claim 1, further comprising:
   streaming a second segment of the multimedia file to the buffer of the computing device, wherein:
      the second segment includes a second set of video frames encoded at a second resolution; and the second set of video frames are subsequent to the first set of video frame.

3. A computer program product comprising one or more computer readable storage media and program instructions stored on the one or more computer readable storage media, the program instructions including instructions to:
- stream a first segment of a multimedia file to a buffer of a computing device at a first bitrate, wherein the first segment of the multimedia file includes a first set of video frames encoded at a first resolution;
- stream, in response to determining that a predetermined frame number of a first portion of the first set of video frames previously streamed to the buffer of the computing device has been displayed on a display screen of the computing device, an additional set of pixels to be added to respective frames of a second portion of the first set of video frames previously streamed to the buffer of the computing device but yet to be displayed on the display screen of the computing device, wherein a predetermined number of pixels included in the additional set of pixels to be added to the respective frames of the second portion of the first set of video frames is increased responsive to an amount of available bandwidth being above a predetermined threshold and decreased responsive to the amount of available bandwidth being below the predetermined threshold; and
- add the additional set of pixels to respective frames of the second portion of first set of video frames previously streamed to the buffer of the computing device to increase the resolution of the second portion of the first set of video frames prior to displaying the second portion of the first set of video frames on the display screen of the computing device.

4. The computer program product of claim 3, further comprising instructions to:
- stream a second segment of the multimedia file to the buffer of the computing device, wherein:
- streaming the second set of video frames included in the second segment includes a second set of video frames encoded at a second resolution; and
- the second set of video frames are subsequent to the first set of video frames.

5. A computer system comprising:
- one or more computer processors;
- one or more computer readable storage media;
- computer program instructions;
- the computer program instructions being stored on the one or more computer readable storage media for execution by the one or more computer processors; and
- the computer program instructions including instructions to:
  - stream a first segment of a multimedia file to a buffer of a computing device at a first bitrate, wherein the first segment of the multimedia file includes a first set of video frames encoded at a first resolution;
  - stream, in response to determining that a predetermined frame number of a first portion of the first set of video frames previously streamed to the buffer of the computing device has been displayed on a display screen of the computing device, an additional set of pixels to be added to respective frames of a second portion of the first set of video frames previously streamed to the buffer of the computing device but yet to be displayed on the display screen of the computing device, wherein a predetermined number of pixels included in the additional set of pixels to be added to the respective frames of the second portion of the first set of video frames is increased responsive to an amount of available bandwidth being above a predetermined threshold and decreased responsive to the amount of available bandwidth being below the predetermined threshold; and
  - add the additional set of pixels to respective frames of the second portion of first set of video frames previously streamed to the buffer of the computing device to increase the resolution of the second portion of the first set of video frames prior to displaying the second portion of the first set of video frames on the display screen of the computing device.

6. The computer system of claim 5, further comprising instructions to:
- stream a second segment of the multimedia file to the buffer of the computing device, wherein:
- streaming the second set of video frames included in the second segment includes a second set of video frames encoded at a second resolution; and
- the second set of video frames are subsequent to the first set of video frames.

7. The computer program product of claim 4, wherein:
the second set of video frames included in the second segment of the multimedia file is streamed at a bitrate that is lower than an optimized bitrate for a network of the computing device.

8. The computer system of claim 6, wherein:
the second set of video frames included in the second segment of the multimedia file is streamed at a bitrate that is lower than an optimized bitrate for a network of the computing device.

* * * * *